United States Patent [19]

Edoardo

[11] 3,912,953

[45] Oct. 14, 1975

[54] DEVICE FOR SOURCES OF PIEZOELECTRIC IGNITION

[76] Inventor: Pilutti Edoardo, Via Venezia 128, 33033 Codroipo, Italy

[22] Filed: Mar. 20, 1974

[21] Appl. No.: 453,033

[30] Foreign Application Priority Data

Mar. 20, 1973 Italy .................................. 83339/73
May 24, 1973 Italy .................................. 83376/73

[52] U.S. Cl. ............................ 310/8.7; 317/DIG. 11
[51] Int. Cl.$^{2}$ .......................................... H01L 41/08
[58] Field of Search ............... 310/8.3, 8.7, 9.1, 9.4; 317/79, DIG. 11

[56] References Cited

UNITED STATES PATENTS

| | | | |
|---|---|---|---|
| 3,262,019 | 7/1966 | Maltner et al. | 310/8.7 X |
| 3,355,755 | 12/1967 | Brooks | 310/8.7 UX |
| 3,462,234 | 8/1969 | Branson et al. | 317/DIG. 11 |
| 3,558,903 | 1/1971 | Yamano | 310/8.7 |
| 3,558,938 | 1/1971 | Good | 310/8.7 |
| 3,819,963 | 6/1974 | Kondo et al. | 310/8.7 |

*Primary Examiner*—Mark O. Budd
*Attorney, Agent, or Firm*—Craig & Antonelli

[57] ABSTRACT

The subject of the present invention is a device suitable for using sources of piezoelectric tension and particularly suitable for transforming a mechanical operation of compression, carried out on piezoelectric crystals, into a series of electrical discharges, which can be used for manifold purposes. The device is characterized by including:

a. an internally hollow framework with two opposed supports, at least one support being adjustable,
b. at least one piezoelectric element resting and pivoting on one support and an opposed rod resting and pivoting on the other support, and
c. an intermediate cam between said piezoelectric element and said opposed rod, said piezoelectric element and said opposed rod being in alignment and lying on the same longitudinal axis of the framework when at rest; a lever acting in coordination with said cam, the cam being able to be supported and guided longitudinally along the longitudinal axis of the framework either by two intermediate longitudinal skids or by two protrusions, intermediate within the framework, which extend opposite to each other and with their faces parallel.

40 Claims, 8 Drawing Figures

DEVICE FOR SOURCES OF PIEZOELECTRIC IGNITION

The subject of the present invention is an improved device, suitable for using sources or generators of piezoelectric tension, and in particular, with improvements to a source of piezoelectric tension suitable for emitting a coordinated series of sparks between two electrodes. In accordance with a more precise content of the invention, the present invention refers to a new device suitable for transforming a mechanical operation of compression, carried out on some piezoelectric crystals, into a series of electrical discharges, which can be utilized for manifold functions, such as: lighting gas, ignition of combustible mixtures in internal-combustion engines, emission of signals, etc.

The properties of some piezoelectric, anisotropic bodies, such as crystals of quartz, tormaline, barium titanate, etc., for example, are known, and if these are subjected to compression or traction in a determined direction, they become electrized on the surface.

This takes place because a mechanical stress, corresponding to compression or traction forces, modifies the electrical dipolar moments of the single elementary cells which are parallel to the axis of the mechanical strain by altering the dimensions of the crystal. This phenomenon produces, as a reaction in conformance with the axis, such a modification of the free surface loads so as to compensate the changes induced in polarization by the volume inside the crystal. When mechanical deformation ceases, the initial situation is reestablished.

In the present invention I shall only consider the stress of compression because of the mechanical ease of producing it. The type of crystal used is not important to the essence of the invention, even though quartz crystals are preferably used.

Many devices are known which are suitable for producing the above phenomenon in a practical manner. Generally these devices use two opposed cylinders, formed of said crystals, and draw from the opposed and reciprocally facing ends of the cylinders, the electrical load, which is brought to one electrode by means of an insulated wire, while the other electrode is connected to ground and in electrical contact with the other two ends of said cylinders.

When mechanical stress occurs, the electrical loads are conveyed by the insulated wire to the electrodes, thus creating a more or less long series of coordinated discharges. This series of discharges also takes place normally when the applied mechanical stress is cancelled.

The first problem to be solved is the necessity of applying a slight force and, at the same time, of obtaining the required compression in the crystals. This is important when these devices are used as household lighters or industrial igniters for acetylene or the like or similar mixtures.

The second problem lies in the need to create a device which is able to resist a series of very high frequency cycles generally almost the same number of cycles as the crystals are able to resist. A further necessity is to create a device which is simple both from the manufacturing point of view and also from the assembly point of view and which at the same time is composed of few parts.

A further problem, connected with the first mentioned, lies in not having sliding surfaces subjected to stress under heavy loads but in having only rolling surfaces subjected to stress under heavy loads.

These problems and disadvantages are overcome by the present invention, and further advantages are realized by the invention.

In one embodiment of the invention, the improved device for sources of piezoelectric tension is characterized by including in combination:

a. an internally hollow framework with two opposed supports and two longitudinal intermediate skids, at least one support being adjustable, b. at least one piezoelectric element resting and pivoting on a support, c. an opposing rod resting and pivoting on the other support, d. an intermediate cam between said piezoelectric element and said opposing rod, wherein said piezoelectric element and said opposing rod are aligned and lie on the same longitudinal axis of the framework when at rest, and wherein the cam is supported and guided longitudinally along the longitudinal axis of the framework by said two intermediate longitudinal skids, such that the cam rotates in the skids and moves longitudinally with the skids, and e. a lever acting in coordination with said cam.

In a second embodiment of the invention, the improved device for sources of piezoelectric voltage is characterized by including in mutual cooperation and combination:

a. an internally hollow framework with two opposite supports at the inner ends of its hollow part, b. at least one piezoelectric element resting and pivoting on one of said supports, c. an opposing rod pivoting on the other support, d. an intermediate cam between said piezoelectric element and said opposing rod, wherein said piezoelectric element and said opposing rod are aligned and lie on the same or almost the same longitudinal axis when at rest, and e. a lever acting in a coordinated manner on and with said cam, wherein there are two opposed intermediate protrusions in the cavity of the framework which face each other frontally and in a parallel manner and extend towards the inside, the cam being supported and transversely guided by the inner parallel faces of said opposed protrusions, and wherein said cam rotates and rolls on said faces of said protrusions.

In accordance with the invention, the cam may be cylindrical or may have one or two faces conforming with the opposing faces of the piezoelectric element and the opposing rod which act upon it, the cam disposed therebetween. The faces may be flat or curved in accordance with the desired principle.

Further, in accordance with the invention, the cam may have a centering and guiding pivot which touches the ends of the piezoelectric element and opposing rod acting thereon.

Also in accordance with the invention, the framework may be rigid or axially distortable, thereby conforming with the dynamics of the production of the required piezoelectric tension.

Preferred embodiments provided for nonlimitative explanatory purposes so as to clarify the essence of the invention and to show further new usages are described with reference to the drawings, which in non-limiting example illustrate in which.

Figures 1, 4:
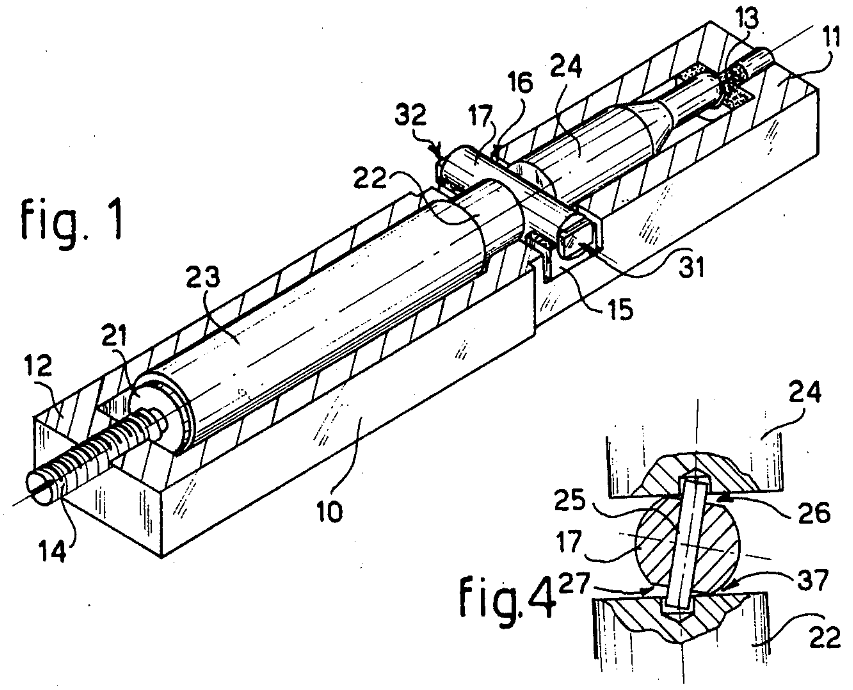
FIG. 1 shows one embodiment of the invention in axial section in an axonometric view.
FIG. 4 illustrates a section showing a preferred type of cam.

Referring to the figures I have a hollow framework 10 with two ends 11 and 12 respectively, which bear, or hold, two supporting elements 13 and 14, of which at least one, such as 14, is adjustable, i. e. axially by means of the threaded element 14 threadedly engaging the end 12. Also, the framework has at an intermediate position two skids 15 and 16, which are free to slide longitudinally along the axis of the framework but not perpendicularly thereto. The two skids 15 and 16 provide a supporting and guiding seat for rotation of the cam 17, such that it is possible for the cam to rotate in the skids and move longitudinally with them.

Figure 7:
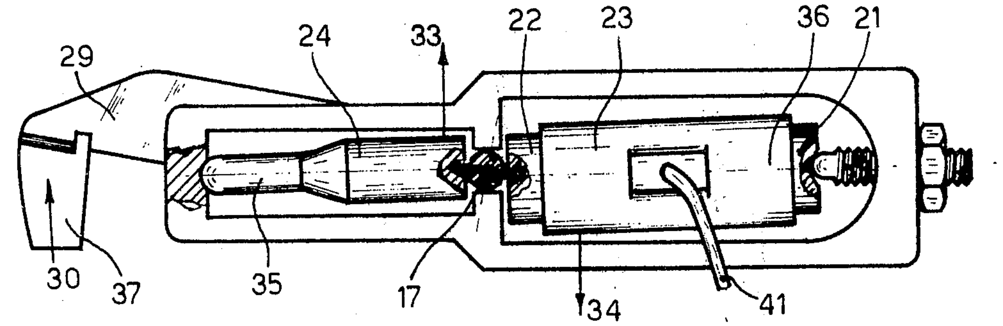
FIG. 7 shows a plan view of the device of FIG. 6 in operation.

Between the two supporting elements 13 and 14, there extend respectively from one side an opposing rod 24, which extends in a pivoting manner between the support 13 and the cam 17, and from the other side two piezoelectric cylindrical elements 18 and 19 with an element 20 between them to collect changes of electrical charge induced in the dipolar electrical moments of the piezoelectric elements. By means of an insulated wire 41 (FIG. 7), this element 20 transfers to the electrodes (not shown here) the tension generated by the surface electrization created by the mechanical stress to which the crystals have been subjected. The parts not shown are well known in the art. In order to obtain a unitary mechanical stress compatible with the physical-mechanical characteristics of the piezoelectric cylinders 18 and 19, two metal blocks 21 and 22 respectively, act at the end faces of said cylinders of which one rests in a pivoting manner on the support 14, while the other rests against the cam 17. To facilitate mounting, the elements 21-18-20-19-22 may be housed in sequential order in an insulating sheath 23.

The cam 17 has a pivot 25, which is freely inserted in the ends of the elements 22 and 24 and which serves to facilitate mounting and maintaining correct positioning.

Figure 2:
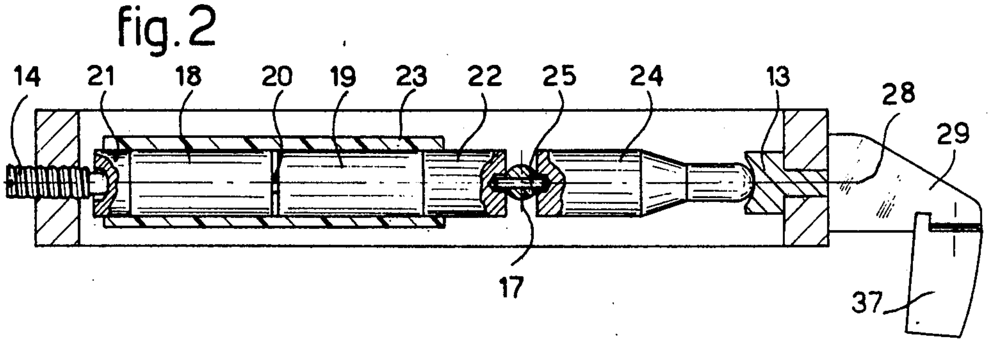
FIG. 2 shows a cross-sectional view of the device of FIG. 1 in a section perpendicular and axial with respect to FIG. 1, the device being at rest.

The cam 17 may have two planar surfaces 26 and 27 corresponding to the surfaces of the elements 22 and 24 which face it. Alternatively, the surfaces 26 and 27 may have only one plane and one curved surface, or both surfaces may be curved as required. The presence of planes facilitates the independent return of the device to its rest position. At rest (see FIG. 2), all the elements lie on the axis 28. By moving the lever 29 in the direction 30, one causes the cam 17 to rotate both because the lever is anchored to the cam by flattened areas 31 and 32 and also because the cam is able to rotate in the skids 15 and 16.

Figure 3:
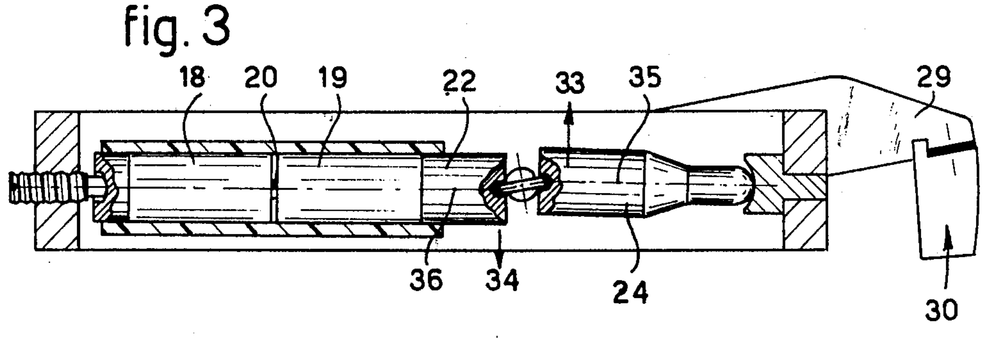
FIG. 3 shows the device in the same section as FIG. 2 but during the mechanical operation of compression.
Figures 5, 8:
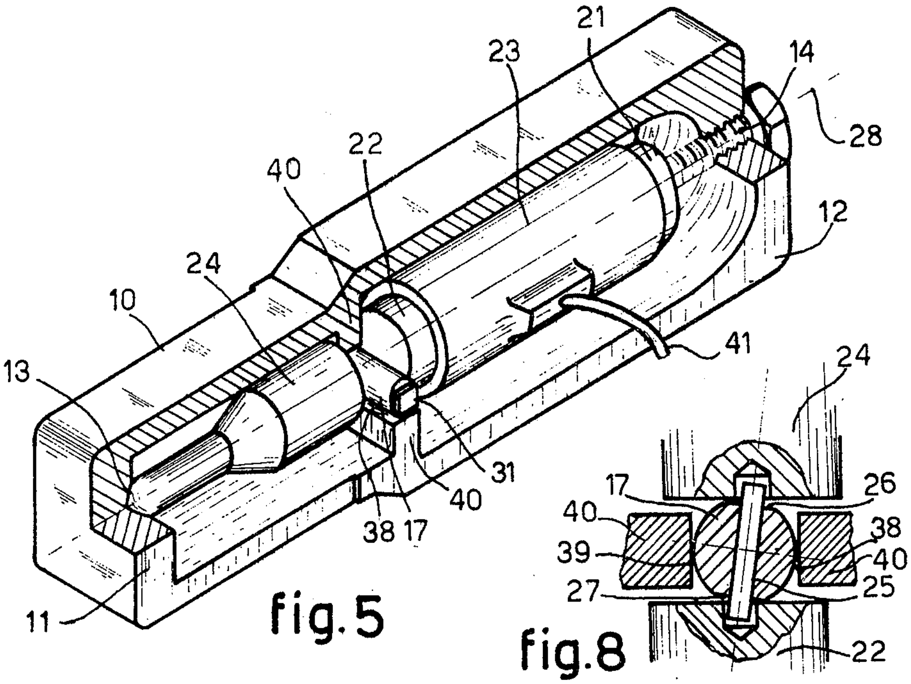
FIG. 5 shows another embodiment of the invention in axonometry.
FIG. 8 shows a section of a preferred type of cam.
Figure 6:
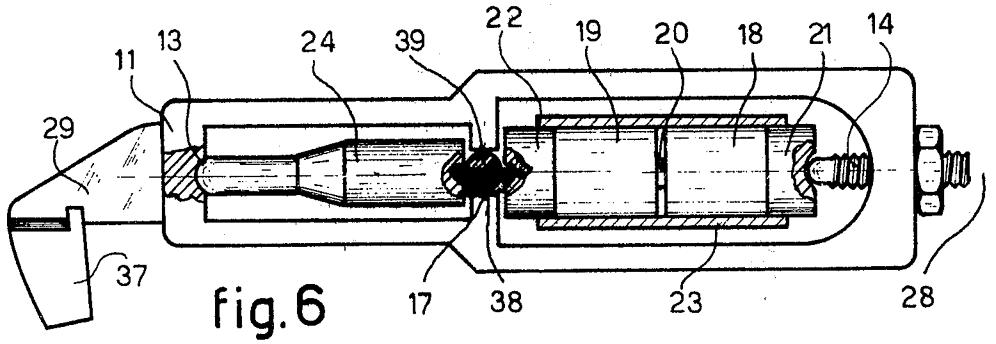
FIG. 6 shows a cross-sectional view of the device of FIG. 5, the device being in a position of rest.

When the cam 17 is rotated (see FIG. 3), it moves the element 24 in the direction 33 and the other elements 21-18-20-19-23-22 in the direction 34. This causes the respective axes 35 and 36 of the elements 24 and 23 to be displaced at an angle to the main axis 28. When the axes 35 and 36 are displaced at an angle, the measurements read on the axis 28 become greater than when the axes 35 and 36 lie on the axis 28. Thus the desired mechanical action of compression is carried out. Since the element 24 is not compressed or is compressed less than the coordinated series of which the cylinders 18 and 19 form part, the cam 17 must be able to move along the axis 28, and from this arises the necessity of providing the longitudinally movable skids 16 and 15.

In accordance with one variation of the invention, by omitting the plane 26 and replacing it by a cylindrical surface of the cam, it is possible to recover the axial deformation of the cylinders 18 and 19 and, therefore, to eliminate the skids 15 and 16. This is possible because the difference between the measurements existing between the center of rotation of the cam and the point of contact 37 can be sufficient to recover axial yielding of the cylinders to the application of the force desired.

In accordance with a second embodiment of the present invention, as shown in FIGS. 5 to 8, the framework 10 is provided at an intermediate position with two internally extending protrusions 40, which face each other frontally and extend inwards with their faces 38 and 39 being perpendicular to the axis of the framework and parallel to the plane of the cavity in the framework 10. These protrusions 40 form a seating for support and transverse positioning of the cam 17. By this means, the cam 17 can rotate and move laterally between the faces 38 and 39, but cannot move perpendicularly to the longitudinal axis of the framework 10, since the axial displacement of the cam 17 is delimited by the arms of the lever 29, which arms are attached to the cam 17 at flattened areas 31 and 32.

The presence of the planar surfaces facilitates the independent return of the device to its position of rest. In its position of rest (see FIG. 6), all the elements lie on or almost on the axis 28. By pressing the lever 29 in the direction 30, the cam 17 is forced to rotate since the lever is anchored to the cam by means of flattened areas 31 and 32. The cam 17 rotates because it is limited in a transverse direction by the planes 38 and 39 of the protrusions 40.

When the cam 17 (see FIG, 7) is rotated, it moves the element 24 in the direction 35 and the other elements 18-19-20-21-22-23 in the direction 34. This causes the respective axes 35 and 36, which previously coincided with or almost coincided with 28, to be displaced at an angle to the main axis 28. When the axes 35 and 36 are displaced at an angle, the measurements on the axis 28 must become greater than they are when the axes 35 and 36 are lying on and in the axis 28. Since the supporting points constituted by 13 and 14 remain fixed, the elements (the cylinders 18 and 19) having the least resistance to tension must yield. The desired mechanical action of compression is thus brought about.

I have here described a preferred layout of the invention, within which, however, many different variations are possible and will be evident to a technician in this field within the compass of the inventive idea.

In particular, the shapes and proportions shown for the various parts can be changed, such as the type and shape of the lever 29; the reciprocal position of the lever 29; the type and shape of the connections 31 and 32 of the lever 29 to the cam 17; the type and shape of the planes 26 and 27 on the cam 17; the type, shape and length of the opposing rod 24; the type and shape of the ends, acting on the cam 17, of the elements 22 and 24; the type and shape of the supports 13 and 14; the type and shape of the framework 10; the type and shape of the cylinders 18 and 19; the type and shape of the sheath 23, and so on.

In addition, certain parts which are not essential to the invention can be omitted or replaced by other components; thus the adjustment means for the support 14 can be omitted, as also can the pin 25, and the skids 15 and 16, which can either be omitted or be replaced by an oval-shaped boring or tubing, or by an elongated boring or tubing with two plane surfaces, facing each other and extending longitudinally along the framework 10; one or both of the faces 26 and 27 can be omitted because they can either be obtained in different ways or be omitted where particular circumstances allow it.

What I claim is:

1. A piezoelectric generator comprising:
- a longitudinal housing framework,
- at least one piezoelectric means supported within said housing framework for generating an electric charge in response to mechanical stress,
- a rod-shaped member supported within said housing framework in alignment with said piezoelectric means along a longitudinal axis of said housing framework,
- supporting means for pivotally supporting said piezoelectric means and said rod-shaped member in said housing framework,
- means for providing movement of said piezoelectric means and said rod-shaped member from alignment on said longitudinal axis, such that compression forces are generated on said piezoelectric means, and
- lever means for activating said means for providing movement.

2. A piezoelectric generator according to claim 1, wherein said supporting means are mounted at ends of said longitudinal housing framework.

3. A piezoelectric generator according to claim 1, wherein said supporting means includes first and second supporting members mounted in opposing relationship along said longitudinal axis at ends of said longitudinal housing framework.

4. A piezoelectric generator according to claim 3, wherein at least said first supporting member is adjustably mounted in said housing framework.

5. A piezoelectric generator according to claim 4, wherein said piezoelectric means, and means for providing movement and said rod-shaped member extend longitudinally in said housing framework between said first and second supporting members.

6. A piezoelectric generator according to claim 1, wherein said piezoelectric means includes an axial sequence a first spacer member, a first piezoelectric element, terminal means for collecting generated electric charge, a second piezoelectric element and a second spacer member.

7. A piezoelectric generator according to claim 6, wherein said piezoelectric means is enclosed in an insulating sheath.

8. A piezoelectric generator according to claim 7, wherein said terminal means includes a conductor to distrubute said generated charge.

9. A piezoelectric generator according to claim 6, wherein said means for providing movement includes a cylindrical-shaped cam member.

10. A piezoelectric generator according to claim 9, wherein said cylindrical-shaped cam member has at least one planar surface in opposing relationship to at least one of said second spacer member and said rod-shaped member.

11. A piezoelectric generator according to claim 9, wherein said cam members includes a pivot means, said pivot means being freely insertable in at least one of said second spacer member and said rod-shaped member.

12. A piezoelectric generator according to claim 6, wherein said means for providing movement includes a pivot means, said pivot means being freely insertable in at least one of said second spacer member and said rod-shaped member.

13. A piezoelectric generator according to claim 6, wherein said lever means is integrally connected with said means for providing movement.

14. A piezoelectric generator according to claim 13, wherein said lever means is movably operated in a plane perpendicular to said longitudinal axis of said housing framework.

15. A piezoelectric generator according to claim 13, wherein said lever means is movably operated in a plane parallel to said axis of said longitudinal axis of said housing framework.

16. A piezoelectric generator according to claim 1, wherein said lever means is integrally connected with said means for providing movement.

17. A piezoelectric generator according to claim 16, wherein said lever means is movably operated in a plane perpendicular to said longitudinal axis of said housing framework.

18. A piezoelectric generator according to claim 16, wherein said lever means is movably operated in a plane parallel to said axis of said longitudinal axis of said housing framework.

19. A piezoelectric generator according to claim 1, further comprising guiding support means for guidably supporting said means for providing movement between said piezoelectric means and said rod-shaped member.

20. A piezoelectric generator comprising:
- a longitudinal housing framework,
- at least one piezoelectric means supported within said housing framework for generating an electric charge in response to mechanical stress,
- a rod-shaped member supported within said housing framework in alignment with said piezoelectric means along a longitudinal axis of said housing framework,
- supporting means for pivotally supporting said piezoelectric means and said rod-shaped member in said housing framework,
- means for providing movement of said piezoelectric means and said rod-shaped member from alignment on said longitudinal axis, such that compression forces are generated on said piezoelectric means, lever means for activating said means for providing movement, and guiding support means for guidingly supporting said means for providing movement between said piezoelectric means and said rod-shaped member, wherein said guiding support means includes two skid members, said skid members supporting said means for providing movement for rotation about an axis perpendicular to said longitudinal axis of said housing framework, and said skid members being mounted to be longitudinally movable with respect to said housing framework such that said means for providing movement is guided along said longitudinal axis.

21. A piezoelectric generator according to claim 20, wherein said housing framework includes elongated seating portions intermediate of the ends of said framework, said skid members being disposed in said elongated seating portions, said elongated seating portions having dimensions greater than said skid members to effect longitudinal movement thereof.

22. A piezoelectric generator according to claim 21, wherein said skid members are provided with central apertures in which said cam means are inserted for rotation.

23. A piezoelectric generator according to claim 22, wherein said means for providing movement includes a cylindrical-shaped cam member.

24. A piezoelectric generator according to claim 23, wherein said cylindrical-shaped cam member has at least one planar surface in opposing relationship to at least one of an end of said piezoelectric means adjacent said cam member and said rod-shaped member.

25. A piezoelectric generator according to claim 23, wherein said cam member includes a pivot means, said pivot means being freely insertable in at least one of an end of said piezoelectric means adjacent said cam member and said rod-shaped member.

26. A piezoelectric generator according to claim 23, wherein said lever means is integrally connected with said cam member.

27. A piezoelectric generator according to claim 20, wherein said piezoelectric means includes in axial sequence a first spacer member, a first piezoelectric element, terminal means for collecting generated electric charge, a second piezoelectric element and a second spacer member.

28. A piezoelectric generator according to claim 27, wherein said piezoelectric means is enclosed in an insulating sheath.

29. A piezoelectric generator according to claim 28, wherein said terminal means includes a conductor to distribute said generated charge.

30. A piezoelectric generator according to claim 19, wherein said means for providing movement includes a cylindrical-shaped cam member, and said guiding support means includes two opposed protrusions formed in said housing framework, said protrusions having end face portions in facing relationship to support said cam member and transversely guide said cam member in rotation about an axis perpendicular to said longitudinal axis of said housing framework.

31. A piezoelectric generator according to claim 30, wherein said end face portions are disposed in planes parallel to said longitudinal axis.

32. A piezoelectric generator according to claim 31, wherein said protrusions are formed integral with said housing framework intermediate of the ends thereof, and said protrusions extend along the axis of rotation of said cam member.

33. A piezoelectric generator according to claim 30, wherein said cylindrical-shaped cam member has at least one planar surface in opposing relationship to at least one an end of said piezoelectric means adjacent said cam member and said rod-shaped member.

34. A piezoelectric generator according to claim 33, wherein said cam member includes a pivot means, said pivot means being freely insertable in at least one of an end of said piezoelectric means adjacent said cam member and said rod-shaped member.

35. A piezoelectric generator according to claim 33, wherein said lever means is integrally connected with said cam member.

36. A piezoelectric generator according to claim 30, wherein said piezoelectric means includes in axial sequence a first spacer member, a first piezoelectric element, terminal means for collecting generated electric charge, a second piezoelectric element and a second spacer member.

37. A piezoelectric generator according to claim 36, wherein said piezoelectric means is enclosed in an insulating sheath.

38. A piezoelectric generator according to claim 37, wherein said terminal means includes a conductor to distribute said generated charge.

39. A piezoelectric generator according to claim 19, wherein said guiding support means includes two substantially oval tubing members providing in said housing framework intermediate the ends thereof, said two oval tubing members extending longitudinally in said housing framework such that said means for providing movement is supported and guided longitudinally along said longitudinal axis.

40. A piezoelectric generator according to claim 19 wherein said guiding support means includes two elongated tubing members having parallel faces which extend longitudinally to said housing framework intermediate the ends thereof, said means for providing movement being supported and guided along said longitudinal axis of said framework by said parallel faces.

* * * * *